June 18, 1946.  P. VAN SITTERT  2,402,308

SHEET FASTENER

Filed Dec. 3, 1942

INVENTOR
PAUL VAN SITTERT
BY
ATTORNEY

Patented June 18, 1946

2,402,308

UNITED STATES PATENT OFFICE 2,402,308

SHEET FASTENER

Paul Van Sittert, Shaker Heights, Ohio, assignor to The Cleveland Pneumatic Tool Company, Cleveland, Ohio, a corporation of Ohio Application December 3, 1942, Serial No. 467,707

9 Claims. (Cl. 85—5)

The present invention relates to fasteners for temporarily holding together perforated plates or sheets in superposed relation preparatory to riveting or the like.

An important object of the invention resides in the provision of a fastener or temporary rivet which may be readily applied to or removed from the work, and constituting a simple assembly which is strong, durable and efficient.

Another object of the invention is to provide a fastener of the above character which includes a housing adapted to rest on the upper face of the sheets to be riveted, a pin mounted for slidable movement within the housing and insertable through aligned perforations of said sheets for maintaining them in aligned position, and means carried by the pin and additional associated mechanism carried by the housing for locking said pin against axial movement relative to the housing after the fastener has been applied to the work.

A further object of the invention is to provide a temporary fastener which does not require the use of special tools for inserting or removing the same from the perforated plates or sheets to be riveted.

Other objects and advantages more or less ancillary to the foregoing reside in the specific construction and aggroupment of the elements peculiar to this structure, as will become apparent from a more complete examination of this specification.

In the drawing which illustrates the invention:

Figure 3:
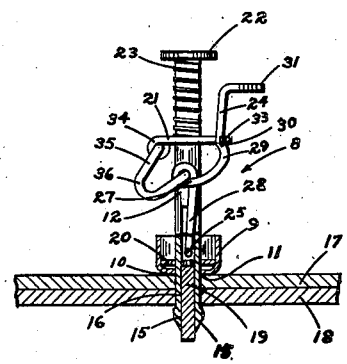
Fig. 3 is a view similar to Fig. 2 illustrating the position assumed by the fastener during the second step of its application to the work.
Figure 4:
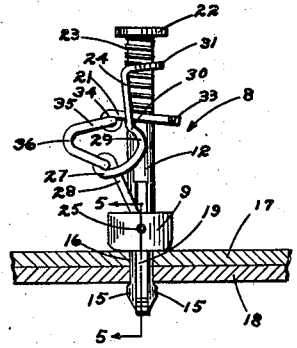
Fig. 4 is a side elevational view of the fastener in clamped position on the work, the locking means having been actuated so as to hold the stem against axial movement relative to the housing.

Referring to the drawing for a more detailed description thereof, a temporary fastener embodying the features of the present invention is generally designated in the several views by the reference numeral 8 and comprises a substantially cylindric cup-shaped housing 9 having its lower end formed by a cross-wall or base 10 in which is formed a cylindrical central bore 11. A pin or stem 12 is mounted for slidable movement within the housing 9, the lower end thereof extending through the central bore 11. The stem 12 is split longitudinally for a portion of its length to provide a pair of sections 13 and 14 and each of said sections is formed with an enlarged end 15 that is preferably tapered to facilitate insertion through the aligned holes 16 of the superposed sheets 17 and 18 which are to be riveted. The enlarged ends 15 are adapted to engage the lower sheet 18 and in conjunction with the housing 9 will hold the sheets 17 and 18 in perfect perforate alignment as illustrated in Figs. 3 and 4 of the drawing.

Resting on the base 10 and projecting through the central bore 11 thereof is a T-shaped spreader 19, said spreader being disposed between the sections 13 and 14 in such a manner that the combined diameter of the sections 13 and 14 and spreader 19 is equal to or slightly smaller than the diameter of the rivet holes 16. An annular member in the form of a ring 20 is positioned within the housing 9 adjacent the bottom wall thereof, said ring resting upon the head of the T-shaped spreader 19 for retaining the same in position.

Positioned substantially intermediate the ends of the stem 12 is a plate 21 that is preferably rectangular shaped, said plate being in part frictionally held on the stem 12. While the plate 21 is capable of vertical movement relative to the stem 12 if manual pressure is exerted on either side thereof, said plate will normally be held stationary so that the stem is free to be moved axially of the housing 9. As will be hereinafter described, the plate 21 is adapted to be moved at an angle relative to the stem whereby said stem will be held against movement relative to the housing 9.

The upper end of the stem 12 is formed with an enlarged head 22 and interposed between said head and the upper face of the plate 21, is a compression spring 23 for constantly urging the stem 12 upwardly relative to the housing 9. The spring 23 also functions to retain the sheets in clamped engagement between the bottom wall 11 of the housing 9 and the enlarged ends 15 which position is shown in Figs. 3 and 4 of the drawing.

Figure 5:
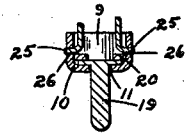
Fig. 5 is a detail sectional view taken substantially on line 5—5 of Fig. 4.

A length of wire 24 has its ends 25 secured in diametrically opposed openings 26 formed in the housing 9 as more particularly shown in Fig. 5. The intermediate portion of the wire 24 extends upwardly from the ends 25 along the stem on opposed sides thereof and is suitably twisted to form a loop or coil 27, it being understood that the loops on each side of the stem are identical in formation and position. The single length of wire 24 provides in effect a leg 28 on each side of the stem and the intermediate portion previously referred to in which the loop 27 is formed will hereinafter be termed the leg of the wire. Each leg 28 is curved outwardly from the loop 27 as indicated at 29 and then is bent inwardly to form a shoulder 30 and from the shoulder the leg extends upwardly substantially parallel to the stem 12 for a predetermined distance before curving outwardly in the shape of a U as indicated at 31 to provide a means adapted to be engaged for moving the plate 21 so as to lock the stem 12 relative to the housing 9.

Figure 1:
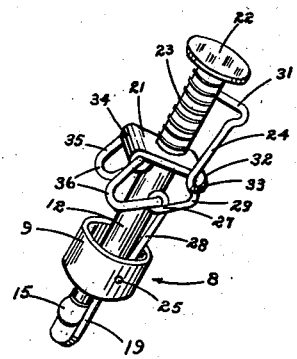
Fig. 1 is a perspective view of an improved fastener embodying the features of the present invention.
Figure 2:
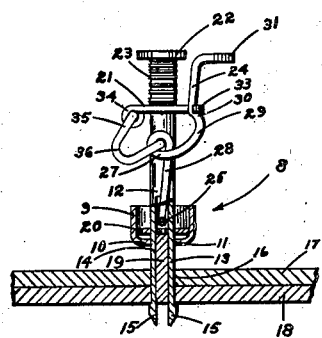
Fig. 2 is a side elevational view, partly in section, of the improved fastener shown in the position assumed during the first step of its application to the work.

One end 32 of the plate 21 is formed with ears 33 on opposite sides thereof adapted to be engaged by the shoulders 30 for aiding in maintaining the plate 21 in a substantially horizontal position on the stem 12 and to further aid in holding said plate against vertical movement relative to said stem. As is to be understood, each leg 28 is formed with a shoulder 30 and each shoulder is engaged by an ear 33 as clearly shown in Figs. 1 and 2.

The opposite end of the plate 21 is suitably rolled to provide a housing 34, said housing supporting a length of wire 35 whose ends are held within the loops or coils 27. That area of the wire 35 between the coils 27 and housing 34 is bent substantially in the shape of a U as indicated at 36 whereby upon movement of the wire 24 toward the stem 12 through the U-shaped handle portion 31, sufficient pressure will be exerted on the end 34 of the member 31 to urge the end 34 upwardly at an angle relative to the stem 12 for locking said stem relative to the housing 9.

Referring to the operation of the device, let it be assumed that the work to be riveted consists of the two superposed sheets 17 and 18. Manual pressure is first exerted downwardly on the stem 12 through its head 22 to project the sections 13 and 14 beyond the spreader 19. The enlarged ends 15, as contact is made with the walls of the holes 16, will flex inwardly and thereby are free to be inserted through the holes 16 until the base 11 rests upon the face of the upper sheet 17. As is to be understood, when initially applying the fastener to the sheets, the plate 21 and lengths of wire 24 and 35 will be in the position shown in Figs. 1, 2 and 3. Upon releasing manual pressure on the stem 12, the spring 23 will urge said stem upwardly until the enlarged ends 15 engage the lower sheet of the work as illustrated in Fig. 3. In this position the tension of the spring 23 will serve to firmly clamp the sheets 17 and 18 between the bottom wall of the housing 9 and the enlarged ends 15. The operator next engages the U-shaped portion 31 of the length of wire 24 and by manual pressure urges the same toward the stem, or from the position shown in Fig. 3 to that shown in Fig. 4. As the wire is moved to the Fig. 4 position, the shoulders 30 are released from the ears 33 and the inward movement of the legs 28 and particularly the loops 27 thereof, will cause the length of wire 35 to be moved outwardly away from the stem 12 thereby forcing the end 34 of the plate 21 upwardly at an angle relative to the stem 12 so that said plate in effect, locks the stem 12 against axial movement in either direction relative to the housing 9. With the lengths of wire 24 and 35 in the position shown in Fig. 4 of the drawing, it is practically impossible to effect movement of the stem 12 in either direction. Thus the fastener is securely clamped to the sheet to be held in that position until the permanent rivets are applied. When desiring to remove the fastener, portion 31 is engaged and swung outwardly away from the stem 12 until the shoulders 30 engage the ears 33. Simultaneously therewith the length of wire 35 will be moved toward the stem thereby lowering the raised end 34 of the plate until it assumes its normal horizontal position on the stem 12. The stem 12 is then free to be manually urged downwardly compressing the spring 23 and while held in that position the sections 13 and 14 are withdrawn from the hole 16.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A device for temporarily securing at least two perforated sheets with their perforations in vertical alignment preparatory to riveting comprising, a housing adapted to rest on the upper sheet, a pin mounted for slidable movement within said housing and insertable through aligned perforations of said sheets for maintaining them in aligned position, means on the inserted end of said pin for engagement with the underside of the lower sheet, means on said pin adapted to be moved at an angle relative thereto for holding said pin against axial movement relative to said housing, and spring means between said second mentioned means and the head of said pin for clamping the sheets between said housing and said first mentioned means.

2. A device for temporarily securing at least two perforated sheets with their perforations in vertical alignment preparatory to riveting comprising, a housing adapted to rest on the upper sheet, a pin mounted for slidable movement within said housing and insertable through aligned perforations of said sheets for maintaining them in aligned position, means on the inserted end of said pin for engagement with the underside of the lower sheet, means for locking said pin relative to said housing, said means including a plate disposed transversely of said pin and capable of movement relative thereto, a spring active between said plate and the head of said pin for clamping the sheets between said housing and said first mentioned means and for locking said plate on said pin, whereby said pin is held against axial movement relative to said housing.

3. A device for temporarily securing at least two perforated sheets with their perforations in vertical alignment preparatory to riveting comprising, a housing adapted to rest on the upper sheet, a pin mounted for slidable movement within said housing and insertable through aligned perforations of said sheets for maintaining them in aligned position, means on the inserted end of said pin for engagement with the underside of the lower sheet, means for locking said pin relative to said housing, said means comprising a member disposed transversely of said pin and capable of movement relative thereto, a spring active between said member and the head of said pin for clamping the sheets between said housing and said first mentioned means, and latching means associated with said member adapted to be manually released for permitting said member to be moved at an angle relative to said pin, whereby said pin is held against axial movement relative to said housing.

4. A device for temporarily securing at least two perforated sheets with their perforations in vertical alignment preparatory to riveting comprising, a housing adapted to rest on the upper sheet, a pin mounted for slidable movement within said housing and insertable through aligned perforations of said sheets for maintaining them in aligned position, means on the inserted end of said pin for engagement with the underside of the lower sheet, means for locking said pin relative to said housing, said means comprising a member disposed transversely of said pin and capable of movement relative thereto, a spring active between said member and the head of said pin for clamping the sheets between said housing and said first mentioned means, and latching means adapted to be manually released for permitting said member to be moved at an angle relative to said pin to cause said member to bind upon the pin whereby said pin is held against axial movement relative to said housing.

5. A device for temporarily securing at least two perforated sheets with their perforations in vertical alignment preparatory to riveting comprising, a housing adapted to rest on the upper sheet, a pin mounted for slidable movement within said housing and insertable through aligned perforations of said sheets for maintaining them in aligned position, means on the inserted end of said pin for engagement with the underside of the lower sheet, means for locking said pin relative to said housing, said means comprising a plate disposed transversely of said pin and capable of movement relative thereto, a spring active between said plate and the head of said pin for clamping the sheets between said housing and said first mentioned means, and latching means adapted to be manually released for permitting said plate to be moved relative to said pin, whereby said pin is held against axial movement relative to said housing.

6. A device for temporarily securing at least two perforated sheets with their perforations in vertical alignment preparatory to riveting comprising, a housing adapted to rest on the upper sheet, a pin mounted for slidable movement within said housing and insertable through aligned perforations of said sheets for maintaining them in aligned position, means on the inserted end of said pin for engagement with the underside of the lower sheet, means for locking said pin relative to said housing, said means including a substantially rectangular shaped plate disposed transversely of said pin and capable of limited movement relative thereto, a spring active between said plate and the head of said pin for clamping the sheets between said housing and said first mentioned means and for moving said plate at an angle relative to said pin, whereby said pin is held against axial movement relative to said housing.

7. A device for temporarily securing at least two perforated sheets with their perforations in vertical alignment preparatory to riveting comprising, a housing adapted to rest on the upper sheet, a pin mounted for slidable movement within said housing and insertable through aligned perforations of said sheets for maintaining them in aligned position, means on the inserted end of said pin for engagement with the underside of the lower sheet, means for locking said pin relative to said housing, said means comprising a substantially rectangular shaped member disposed transversely of said pin and capable of movement relative thereto, means anchored in said housing and extending upwardly therefrom along said stem having engagement with one end of said member, said last named means comprising a latch for engagement with the other end of said member to hold it at right angles to said pin, said latch being manually releasable to permit said member to be swung to an angular position relative to said pin, whereby said pin is held against axial movement relative to said housing.

8. A plate holder of the character described, comprising a perforated housing and a pin slidable therethrough having a head on one end and a work engaging enlargement on its opposite end, mounting means anchored in the housing, a plate hinged to said mounting means having a perforation therethrough loosely surrounding said pin when the plate stands at right angles to the pin, a spring between said plate and the head of said pin for drawing said housing and said enlargement toward each other when the plate is held at right angles to the pin, said spring being adapted to swing said plate when relieved of constraint into an angular position relative to the pin for causing it to grip the pin by a binding action.

9. A plate holder of the character described, comprising a perforated housing and a pin slidable therethrough having a head on one end and a work engaging enlargement on its opposite end, means for drawing said housing and pin enlargement toward each other comprising a member anchored in the housing and carrying a hinged plate provided with a perforation larger than the pin through which the pin extends, said means also including a latch for holding the plate at right angles to the pin and a spring between said plate and the head of the pin, whereby when said holder is in plate gripping position, said latch may be released permitting said plate to swing upon its hinge into position to bind upon the pin.

PAUL VAN SITTERT.